(12) United States Patent
Kanda et al.

(10) Patent No.: US 7,605,506 B2
(45) Date of Patent: Oct. 20, 2009

(54) ELECTRIC MOTOR WITH REDUCTION GEAR MECHANISM

(75) Inventors: Satoshi Kanda, Kiryu (JP); Shuichi Hatori, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 303 days.

(21) Appl. No.: 11/829,183

(22) Filed: Jul. 27, 2007

(65) Prior Publication Data

US 2008/0048507 A1 Feb. 28, 2008

(30) Foreign Application Priority Data

| Jul. 28, 2006 | (JP) | ............................. 2006-206459 |
| Jul. 28, 2006 | (JP) | ............................. 2006-206460 |
| Jul. 28, 2006 | (JP) | ............................. 2006-206461 |
| Jun. 21, 2007 | (JP) | ............................. 2007-163459 |
| Jun. 21, 2007 | (JP) | ............................. 2007-163460 |

(51) Int. Cl.
*H02K 11/00* (2006.01)

(52) U.S. Cl. .............................. 310/71; 310/51; 310/83; 310/75 R; 310/89

(58) Field of Classification Search .................. 310/42, 310/51, 71, 83, 75 R, 89
See application file for complete search history.

(56) References Cited

U.S. PATENT DOCUMENTS

| 5,063,317 | A | * | 11/1991 | Bruhn | ........................ 310/91 |
| 5,194,769 | A | * | 3/1993 | Ade et al. | ...................... 310/51 |
| 5,691,585 | A | * | 11/1997 | Shoda | .......................... 310/71 |
| 6,573,625 | B2 | * | 6/2003 | Shimizu et al. | ............... 310/71 |
| 6,653,754 | B2 | * | 11/2003 | Uchida et al. | ................. 310/51 |
| 6,727,613 | B2 | * | 4/2004 | Saitou et al. | ............. 310/75 R |
| 6,921,994 | B2 | * | 7/2005 | Kawakami et al. | ........ 310/75 R |
| 2001/0026104 | A1 | * | 10/2001 | Shimizu et al. | ............... 310/71 |

FOREIGN PATENT DOCUMENTS

| JP | 2004-104884 A | 4/2004 |
| JP | 2004-104886 A | 4/2004 |
| JP | 2004-159433 A | 6/2004 |
| JP | 2006-094692 A | 4/2006 |

\* cited by examiner

*Primary Examiner*—Thanh Lam
(74) *Attorney, Agent, or Firm*—McCormick, Paulding & Huber LLP (57) ABSTRACT

In a wiper motor including a motor body and a reduction gear apparatus, an accommodating case is integrally provided on a brush holder provided to the motor body, and this accommodating case is disposed on an outer face of a gear case so as to project from a motor yoke. A noise-preventing element including a pair of choke coils and a bidirectional varistor is accommodated in the accommodating case, and the noise-preventing element is connected between a power-feeding terminal of a connector provided on the gear case and brushes. Noises acting on a power-feeding circuit are absorbed by the noise-preventing element and noises which have leaked to the outside via an opening portion of the motor yoke are absorbed by the noise-preventing element.

17 Claims, 10 Drawing Sheets

ELECTRIC MOTOR WITH REDUCTION GEAR MECHANISM

CROSS-REFERENCE TO RELATED APPLICATIONS

Applicant hereby claims foreign priority benefits under U.S.C. §119 from Japanese Patent Application No. 2006-206459 filed on Jul. 28, 2006, No. 2006-206460 filed on Jul. 28, 2006, No. 2006-206461 filed on Jul. 28, 2006, No. 2007-163459 filed on Jun. 21, 2007, and No. 2007-163460 filed on Jun. 21, 2007, the contents of which are incorporated by reference herein.

FIELD OF THE INVENTION

The present invention relates to an electric motor with reduction gear mechanism including a motor body provided with a rotating shaft and a reduction gear mechanism for decelerating rotation of the rotating shaft to output it from an output shaft.

BACKGROUND OF THE INVENTION

An electric motor activated by a power source such as a battery loaded in a vehicle is generally used as a drive source for a wiper apparatus, a power window apparatuses, an electric sun-roof apparatus, or the like which is provided in the vehicle. In order to adapt the electric motor to each of these apparatus, it is necessary to reduce the number of rotations of the motor up to the number of predetermined rotations. Therefore, a reduction gear mechanism is attached to such an electric motor so as to constitute the electric motor with reduction gear mechanism as a single unit.

A motor with brush is frequently used as a motor body of the electric motor with reduction gear mechanism. However, since noises are generated from a slide-contact portion between a brush and a commutator in the motor, it is necessary to adopt any measures for preventing the noises from causing damages to other electrical components or the like (radio noise or the like).

For example, Patent Document 1 (Japanese Patent Application Laid-Open Publication No. 2006-94692) describes a motor in which: a noise-preventing element such as a choke coil or a capacitor is mounted on a brush holder fixed in a motor yoke for absorbing noises near a brush which is a noise generating source; and noises on a power feeding circuit is absorbed by the element, thereby being prevented from being emitted outside the motor.

SUMMARY OF THE INVENTION

However, noises generated from the slide-contact portion between the brush and the commutator are diffusely reflected on an inner face of the motor yoke. Therefore, in the motor in which the noise-preventing element such as a choke coil or a capacitor is provided on the brush holder, there is such a drawback that a portion of the diffusely reflected noises flies to a wiring located on a side of the power-feeding terminal rather than the choke coil or capacitor and is emitted, without being absorbed by the noise-preventing element, from the motor yoke to the outside via a wiring of a connector provided on the gear case.

An object of the present invention is to reduce noises emitted from the motor body to the outside.

An electric motor with reduction gear mechanism according to the present invention includes a motor body provided with a rotating shaft and a reduction gear mechanism for decelerating rotation of the rotating shaft to output it from an output shaft, the electric motor comprising: an armature provided with a commutator fixed to the rotating shaft and a coil connected to the commutator; a motor yoke having a magnet mounted on its inner face and rotatably accommodating the armature; a brush holder mounted inside the motor yoke and holding a pair of brushes slide-contacting with the commutator; a gear case fixed to the motor yoke and accommodating the reduction gear mechanism; a connector provided with a pair of power-feeding terminals each connected to a power source, the connector being disposed on the gear case; an accommodating case provided integrally with the brush holder and projecting toward the gear case via an opening portion of the motor yoke to be disposed on an outer face of the gear case; and a noise-preventing means accommodated in the accommodating case and connected between the brushes and the power-feeding terminal.

An electric motor with reduction gear mechanism according to the present invention includes a motor body provided with a rotating shaft and a reduction gear mechanism for decelerating rotation of the rotating shaft to output it from an output shaft, the electric motor comprising: an armature provided with a commutator fixed to the rotating shaft and a coil connected to the commutator; a motor yoke having a magnet mounted on its inner face and rotatably accommodating the armature; a brush holder mounted inside the motor yoke and holding a pair of brushes slide-contacting with the commutator; a motor-yoke-side grounding terminal provided on the brush holder, connected to each of the brushes on a negative-pole side, and contacting with the inner face of the motor yoke; a gear case formed from a conductor, fixed in a state where the gear case has been electrically connected to the motor yoke, and accommodating the reduction gear mechanism; a connector provided with a pair of power-feeding terminals each connected to a power source, the connector being disposed on the gear case; a noise-preventing means accommodated in an accommodating case disposed on an outer face of the gear case, connected to the brushes via an opening portion of the motor yoke by a pair of brush-side connecting plates, and connected to the power-feeding terminals by a pair of power-feeding-side connecting plates; and a gear-case-side grounding terminal provided on a negative-pole side of the power-feeding-side connecting plate and including a gear-case-side grounding terminal contacting with the gear case.

The electric motor with reduction gear mechanism according to the present invention is such that the noise-preventing means includes a pair of choke coils connected in series between the brushes and the power-feeding terminals so as to correspond to the choke coils and a capacitive device electrically connected to the pair of choke coils.

The electric motor with reduction gear mechanism according to the present invention is such that the accommodating case has a partition wall for separating the choke coils and the capacitive device from one another.

The electric motor with reduction gear mechanism according to the present invention is such that the capacitive device comprises a bidirectional varistor.

The electric motor with reduction gear mechanism according to the present invention is such that the capacitive device is a capacitor.

The electric motor with reduction gear mechanism according to the present invention is such that the capacitive device is a varistor.

The electric motor with reduction gear mechanism according to the present invention further comprises: a pair of brush-side connecting plates for connecting the brushes and the noise-preventing means via the opening portion of the motor yoke; and a pair of power-feeding-side connecting plates for connecting the noise-preventing means and the power-feeding terminals.

The electric motor with reduction gear mechanism according to present invention is such that the gear-case-side grounding terminal is formed by bending a portion located on a negative-pole side of the power-feeding-side connecting plate, and the gear-case-side grounding terminal is caused to contact with a ground protrusion portion provided on the gear case in a state of being elastically deformed.

The electric motor with reduction gear mechanism according to the present invention is such that the protrusion portion is disposed on a crossing line between a plane, which passes through an axial center of the rotating shaft and is orthogonal to the outer face, and the outer face, and a pair of the connecting plates are disposed so as to sandwich the protrusion portion therebetween and be opposed to each other.

The electric motor with reduction gear mechanism according to the present invention further comprises: a pair of connecting portions provided on the brush holder and connecting the brushes and the pair of brush-side connecting plates; and a partition wall provided in the accommodating case to project between the pair of brush-side connecting plates.

The electric motor with reduction gear mechanism according to the present invention is such that a projection distance of the partition wall from the accommodating case is equal to or longer than a projection distance of each of the pair of brush-side connecting plates from the accommodating case.

The electric motor with reduction gear mechanism according to the present invention is such that the partition wall is provided at an end portion of the accommodating case located on a side of the brush holder.

The electric motor with reduction gear mechanism according to the present invention further comprises a confirming window formed in the accommodating case to allow confirmation of presence/absence of the noise-preventing means.

The electric motor with reduction gear mechanism according to the present invention further comprises a confirming window formed in the accommodating case to allow confirmation of presence/absence of a connection between the noise-preventing means and the brush-side connecting plate or power-feeding-side connecting plate.

The electric motor with reduction gear mechanism according to the present invention is such that the confirming window is formed in a side face of the accommodating case and is covered with the motor yoke or connector.

The electric motor with reduction gear mechanism according to the present invention is such that the confirming window is formed on a bottom face of the accommodating case and is covered with an outer face of the gear case.

According to the present invention, since the noise-preventing means is disposed outside the motor yoke, noises emitted from the interior of the motor yoke through the opening portion can be collectively removed before propagating to other wirings. Therefore, the noises emitted from the electric motor with reduction gear mechanism can be reduced.

Also, according to the present invention, since the brushes are grounded on the motor yoke and noises that have not been removed by the noise-preventing means are returned back to the interior of the motor body via the gear-case-side grounding terminal and the motor-yoke-side grounding terminal, emission of noises to the outside of the motor can be reduced.

Further, according to the present invention, since the grounding terminal is formed by bending a portion of the connecting plate on the negative-pole side and the grounding terminal is caused to contact with the ground protrusion portion provided on the gear case in an elastically deformed state thereof, sufficiently flexing length of the gear-case-side grounding terminal can be assured even in a narrow space, whereby the power-feeding circuit of the electric motor with reduction gear mechanism can be grounded on the gear case reliably. Also, since the gear-case-side grounding terminal can be reliably grounded on the gear case without using a fastening member such as a screw, the number of parts and the number of assembling steps for the electric motor with reduction gear mechanism can be reduced.

Further, according to the present invention, the partition wall projecting between the pair of brush-side connecting plates is provided in the accommodating case. Therefore, when each of the pair of brush-side connecting plates is soldered to a corresponding connection portion of the brush holder, even if solder flows from one of the brush-side connecting plates, the flow of the solder is stopped by the partition wall. That is, the flowing solder can be prevented from expanding to the brush-side connecting plate. Thereby, it is possible to prevent short-circuiting caused due to the flow of the solder.

Further, according to the present invention, since the confirming window for allowing confirmation of presence/absence of the noise-preventing means or the connection between the noise-preventing means and the brush-side connecting plate or power-feeding-side connecting plate is formed in the accommodating case, even if the accommodating case is covered with a lid, an operator can look an interior of the accommodating case through the confirming window. Thereby, it is possible to confirm provision of the noise-preventing means in the accommodating case and a connection location of the noise-preventing means.

DESCRIPTION OF THE PREFERRED EMBODIMENTS

An embodiment of the present invention will be explained below in detail with reference to the drawings.

Figure 1:
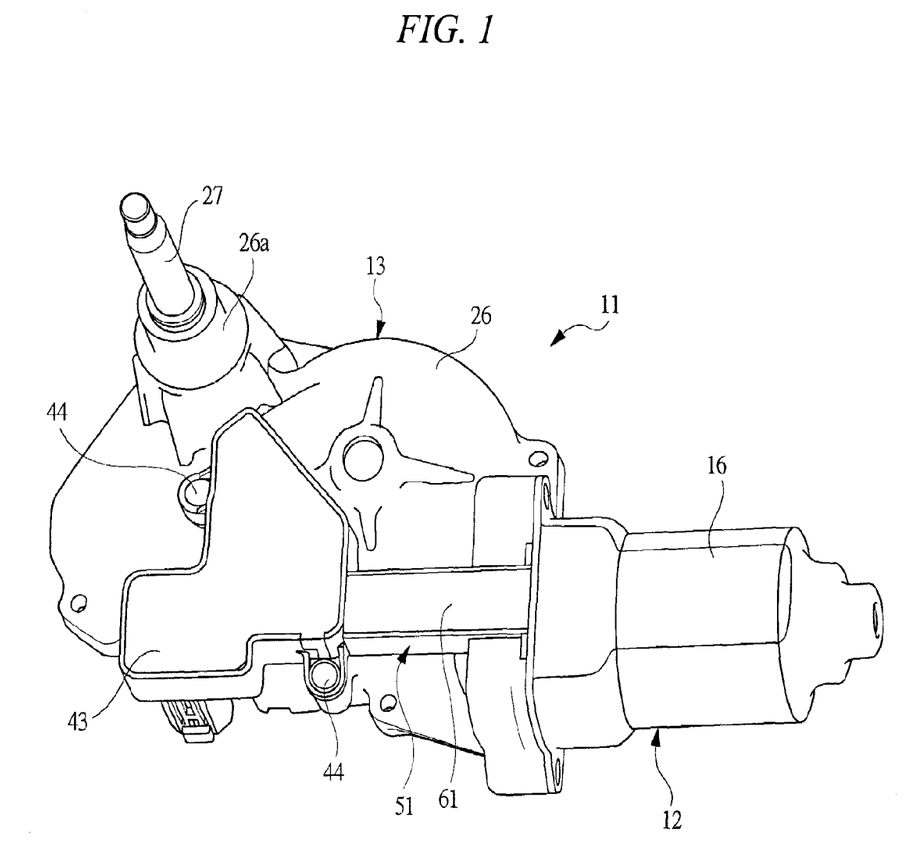
FIG. 1 is a perspective view showing a wiper motor according to an embodiment of the present invention.
Figure 2:
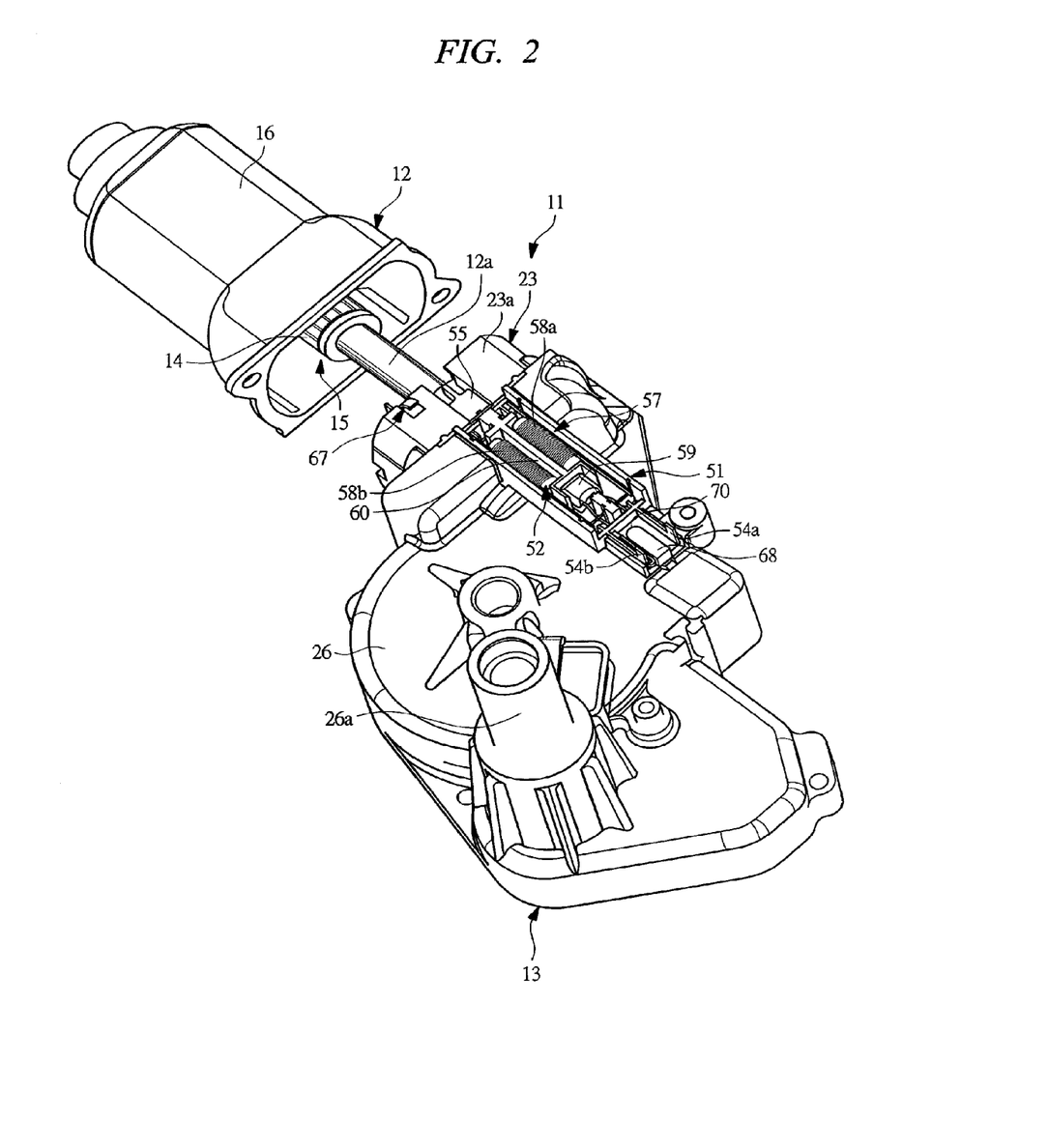
FIG. 2 is an exploded perspective view of the wiper motor shown in FIG. 1.

FIG. 1 is a perspective view showing a wiper motor according to an embodiment of the present invention and FIG. 2 is an exploded perspective view of the wiper motor shown in FIG. 1.

A wiper motor 11 shown in FIG. 1 is used as a drive source for a rear wiper apparatus provided on a vehicle, and serves as an electric motor with reduction gear mechanism in which a motor body 12 and a reduction gear apparatus 13 are constituted as a single unit.

As shown in FIG. 2, the motor body 12 serves as a motor with brush provided with a rotating shaft 12a, wherein a commutator 14 and an armature core not shown are fixed to the rotating shaft 12a. A plurality of coils (armature coils) not shown are wound around slots of the armature core, and ends of the coils are respectively connected to corresponding segments of the commutator, whereby an armature 15 is composed of the commutator 14 and the coils.

The motor body 12 has a motor yoke 16 with an oval cross-sectional, bottomed cylindrical shape, and the armature 15 is rotatably accommodated in the motor yoke 16 since one end of the rotating shaft 12a is rotatably supported to a bottom portion of the motor yoke 16. A pair of magnets (not shown) with different magnetic poles is mounted on an inner face of the motor yoke 16 so as to be opposed to each other, and the armature core around which the coils are wound is positioned within a magnetic field formed by the magnets and the motor yoke 16.

Figure 3:
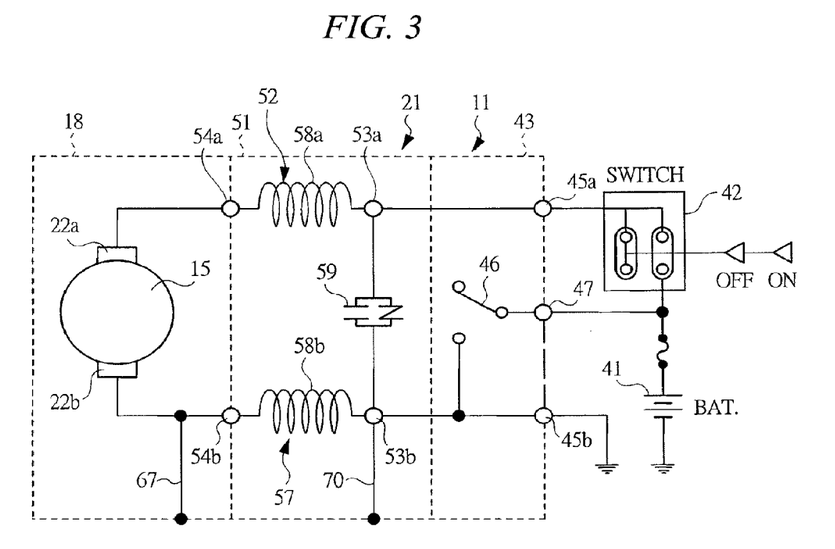
FIG. 3 is a power-feeding circuit diagram of the wiper motor shown in FIG. 1.
Figure 4:
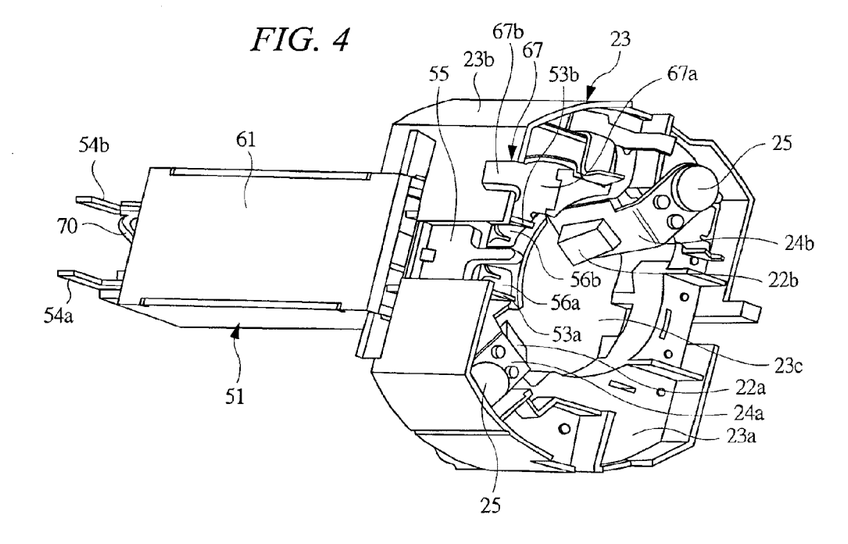
FIG. 4 is a perspective view showing a detail of a brush holder provided to a motor body.

FIG. 3 is a power-feeding circuit diagram of the wiper motor shown in FIG. 1, and FIG. 4 is a perspective view showing a detail of a brush holder provided on the motor body.

In the wiper motor 11, a power-feeding circuit 21 shown in FIG. 3 is provided to feed a drive current to the motor body 12. The power-feeding circuit 21 has a pair of brushes 22a and 22b, each of which slide-contacts with an outer peripheral face of the commutator 14. As shown in FIG. 2, a brush holder 23 is provided inside the motor yoke 16 to hold the brushes 22a and 22b.

As shown in FIG. 4, the brush holder 23 is made from a resin material and comprises: a body wall portion 23a perpendicular to an axial direction of the rotating shaft 12a; and an outer-peripheral wall portion 23b formed in a cylindrical shape and extending along an inner face of the motor yoke 16 to cover an outer periphery of the body wall portion 23a, wherein the outer-peripheral wall portion 23b is mounted inside the motor yoke 16 so as to slide-contact with an inner wall of the motor yoke 16. A through hole 23c is formed at an axial center of the body wall portion 23a, so that the commutator 14 of the armature 15 is inserted into the through hole 23c to be disposed inside the body wall portion 23a when the brush holder 23 is mounted on the motor yoke 16.

As shown in FIG. 4, the pair of brushes 22a and 22b held by the brush holder 23 are fixed to one ends of leaf springs 24a and 24b bent like a shape of an inequality sign "<", respectively, and the other ends of the leaf springs 24a and 24b are fixed to the brush holder 23 by fastening members (bolts) 25, so that the brushes 22a and 22b slide-contact with an outer peripheral face of the commutator 14 in states of being biased by the leaf springs 24a and 24b. The leaf springs 24a and 24b are made of metal plates such as copper plates, and when a direct current is supplied to the respective leaf springs 24a and 24b, it is supplied to the brushes 22a and 22b via the leaf springs 24a and 24b. When the current is supplied to the respective brushed 22a and 22b, it is commutated by the commutator 14 to be supplied to the respective coils, thereby being carried into the coils located within the magnetic field so that the rotating shaft 12a together with the armature 15 is rotated.

Incidentally, other elements configuring the power-feeding circuit 21 will be sequentially described later.

Figure 5:
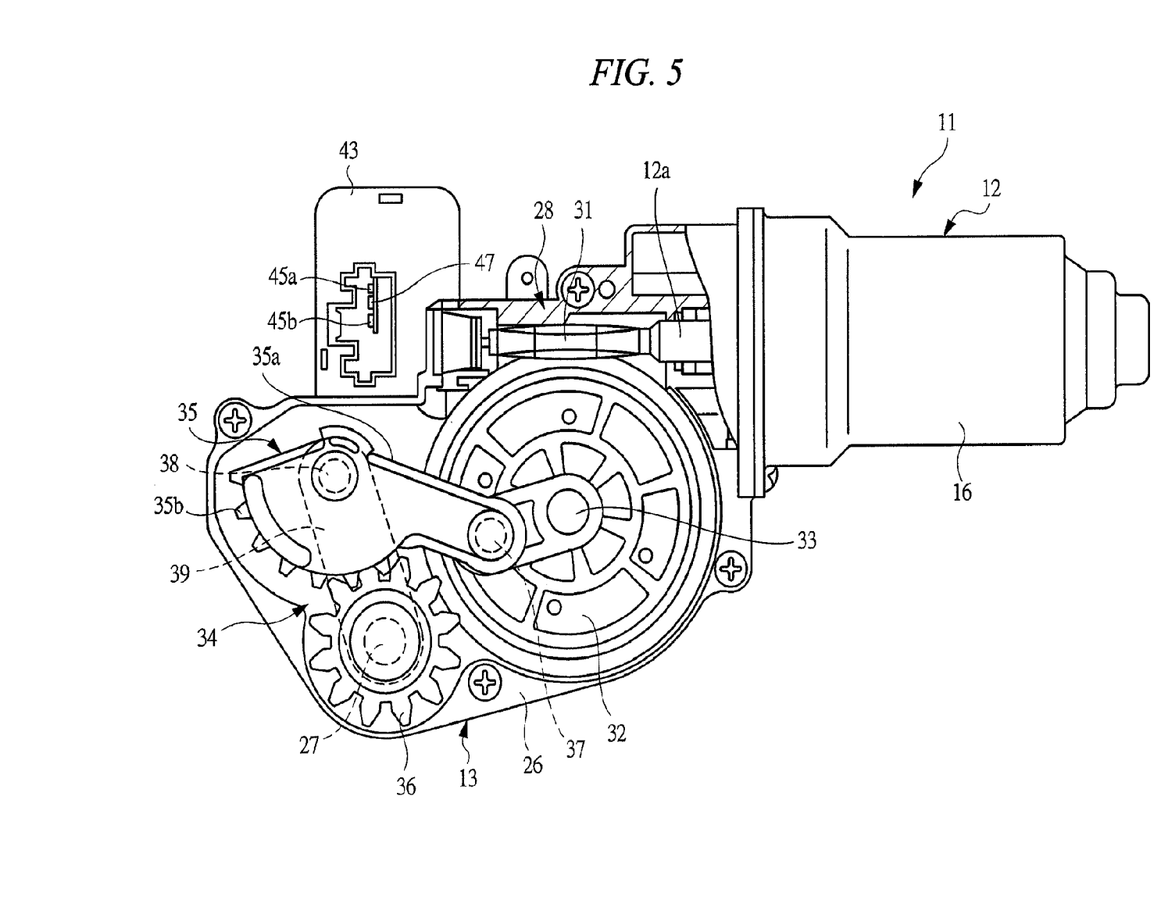
FIG. 5 is a partially-broken sectional view showing an internal structure of a reduction gear apparatus shown in FIG. 1.

FIG. 5 is a partially-broken sectional view showing an internal structure of the reduction gear apparatus shown in FIG. 1.

Meanwhile, the reduction gear apparatus 13 has a gear case 26 fixed to the motor yoke 16. The gear case 26 is made from a conductor such as an aluminum alloy, and is electrically connected to the motor yoke 16 when being fixed to the motor yoke 16.

As shown in FIG. 5, a reduction gear mechanism 28 is accommodated in the gear case 26. The reduction gear mechanism 28 serves as a worm gear mechanism provided with a worm 31 and a worm wheel 32 meshing with the worm 31, wherein the worm 31 is integrally formed on an outer peripheral face of a portion of the rotating shaft 12a projecting inside the gear case 26 and the worm wheel 32 is supported by a supporting shaft 33 provided on the gear case 26 so as to be rotatable inside the gear case 26. Accordingly, when the motor body 12 is activated to rotate the rotating shaft 12a, rotation of the rotating shaft 12a is reduced up to the number of predetermined rotations by the reduction gear mechanism 28 to be transmitted to the worm wheel 32.

The reduction gear apparatus 13 is provided with a power converting mechanism 34 in order to convert rotation of the worm wheel 32 to swinging movement to transmit the same to an output shaft 27. The power converting mechanism 34 has a power converting member 35 and an output gear 36. The power converting member 35 has an arm portion 35a and a sector gear portion 35b, wherein a tip portion of the arm portion 35a is rotatably coupled at a position separate from a center axis of rotation of the worm wheel 32 by a linking shaft 37. On the other hand, the output gear 36 is fixed to a base end portion of the output shaft 27 projecting inside the gear case 26 to be caused to mesh with the sector gear portion 35b of the power converting member 35. A gear shaft 38 is provided at an axial center of the sector gear portion 35b, and the gear shaft 38 and the output shaft 27 are coupled swingably by a plate member 39, so that the sector gear portion 35b is held in a state of being caused to mesh with the output gear 36.

By such a structure, when the motor body 12 is activated to rotate the worm wheel 32, the arm portion 35a is reciprocated and the sector gear portion 35b is swung to the output shaft 36 according to the rotation of the worm wheel 32, so that the rotating movement of the worm wheel 32 is converted to swinging movement to be outputted from the output shaft 27. That is, in the wiper motor 11, the rotating movement of the rotating shaft 12a which is power of the motor body 12 is decelerated by the reduction gear mechanism 28 and is converted to the swinging motion by the power converting mechanism 34 to be outputted from the output shaft 27.

As shown in FIG. 1, a boss portion 26a projecting in parallel with the supporting shaft 33 is formed on the gear case 26, and the output shaft 27 is rotatably supported to the boss portion 26a in parallel with the supporting shaft 33. A tip of the output shaft 27 projects from the boss portion 26a to the outside, and a rear wiper arm constituting the rear wiper apparatus is attached to such a tip. Thereby, when the motor body 12 is activated, the rear wiper arm together with the output shaft 27 is swung, whereby a wiping action is performed by the rear wiper apparatus.

In order to connect the power-feeding circuit 21 to a power source 41 as a battery loaded in the vehicle and to a wiper switch 42, the wiper motor 11 is provided with a connector 43. As shown in FIG. 1, the connector 43 is formed as an independent unit, and is disposed on an outer face of the gear case 26 and fixed to the gear case 26 by fastening members (bolts) 44. As understood from FIGS. 3 and 5, the connector 43 is provided with a pair of power-feeding terminals 45a and 45b, and the power-feeding terminal 45a is connected to the power source 41 and the wiper switch 42 via a wiring while the power-feeding terminal 45b is connected to an external connector (not shown) located on a vehicle-body side to be grounded to the vehicle body. When the wiper switch 42 is turned on, the current is fed from the power source 41 to the power-feeding terminal 45a.

The connector 43 is provided with a switch terminal 46 for automatic stop circuit, and this switch terminal 46 is inserted into the gear case 26 from an insertion hole (not shown) provided in the gear case 26, thereby contacting with a relay plate (not shown) rotated together with the worm wheel 32. When the rear wiper arm reaches a lowermost reversing position, a position detecting signal is outputted from a position detecting terminal 47 of the connector 43 to a controller (not shown) via the switch terminal 46 and the relay plate. Even if the wiper switch 42 is operated for stopping unintentionally, the controller stops the motor body 12 just when the rear wiper arm has reached the lowermost reversing position.

As shown in FIG. 1, an accommodating case 51 is disposed on the outer face of the gear case 26.

Figure 6:
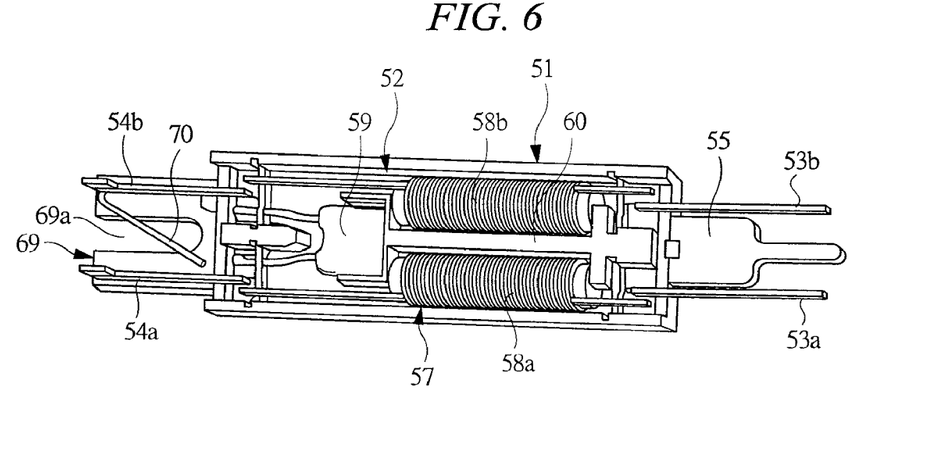
FIG. 6 is a perspective view showing a detail of an accommodating case shown in FIG. 1.

FIG. 6 is a perspective view showing a detail of the accommodating case shown in FIG. 1. The accommodating case 51 is made from a resin material and formed into a vertically long bathtub shape and, as shown in FIG. 4, one end of the accommodating case 51 is assembled to the brush holder 23 so as to extend along the outer-peripheral wall portion 23b. That is, the accommodating case 51 is fixed to the brush holder 23 to be provided integrally with the brush holder 23. When the brush holder 23 is mounted on the motor yoke 16, the accommodating case 51 projects from an interior of the motor yoke 16 toward the gear case 26 via an opening portion of the motor yoke 16. When the gear case 26 is fixed to the motor yoke 16, the accommodating case 51 is disposed on an outer face of the gear case 26.

A connecting unit 52 electrically connecting the brushes 22a and 22b and the power source 41 is accommodated in the accommodating case 51. As shown in FIG. 6, the connecting unit 52 comprises: a pair of brush-side connecting plates 53a and 53b fixed to one end of the accommodating case 51 located on a side of the brush holder 23 (hereinafter called also "brush-holder-side end portion"); a pair of power-feeding-side connecting plates 54a and 54b fixed to an end portion of the accommodating case 51 located on a side of the connector 43; and a noise-preventing means (noise-preventing element) 57 provided between the brush-side connecting plates 53a and 53b and the power-feeding-side connecting plates 54a and 54b. Incidentally, FIG. 6 shows a state where a lid of the accommodating case 51 has been removed.

Figure 7:
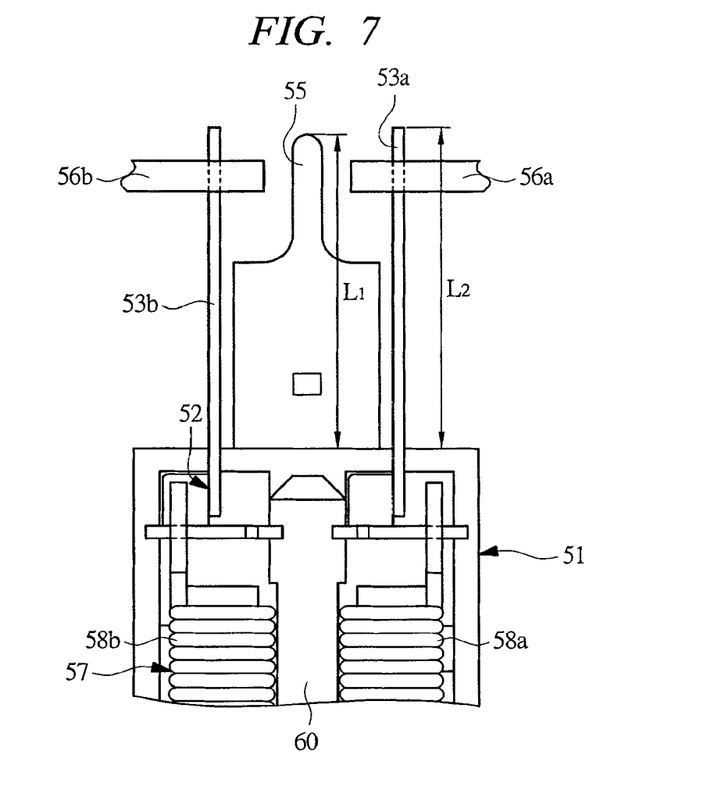
FIG. 7 is a plan view showing a main portion of a connecting unit.

FIG. 7 is a plan view showing a main portion of the connecting unit. As shown in FIG. 7, the brush-side connecting plates 53a and 53b are formed by bending metal plates such as copper plates, respectively. On the other hand, as shown in FIG. 4, the brush holder 23 is provided with wiring plates connected to the leaf springs 24a and 24b of the corresponding brush units 22a and 22b, and a pair of unit connecting portions (connecting portions) 56a and 56b are provided on end portions of the wiring plates.

As shown in FIG. 7, one end portions of the brush-side connecting plates 53a and 53b are connected to the unit connecting portions 56a and 56b, respectively. The other end portions of the brush-side connecting plates 53a and 53b project into the accommodating case 51 via the opening portion of the motor yoke 16 in parallel with each other.

A partition wall 55 projecting from an end portion of the accommodating case located on the brush holder side is provided between the pair of brush-side connecting plates 53a and 53b. The partition wall 55 is formed so that a projection distance $L_1$ from the end portion thereof located on the brush holder side becomes equal to a projection distance $L_2$ of each of the brush-holder-side connecting plates 53a and 53b from the end portion thereof located on the brush holder side. In an example shown in FIG. 7, the partition wall 55 is spaced evenly from the brush-side connecting plates 53a and 53b, and width of a tip-side half of the partition wall 55 is smaller than that of a base-end-side half of the partition wall 55.

Thus, in the wiper motor 11, since the partition wall 55 is provided between the pair of brush-side connecting plates 53a and 53b, it is possible to prevent short-circuiting occurring due to a flow of solder.

That is, as shown in FIG. 4 and FIG. 7, when the accommodating case 51 is assembled to the brush holder 23, the brush-side connecting plates 53a and 53b are connected to the unit connecting portions 56a and 56b by soldering, respectively. The unit connecting portions 56a and 56b are disposed at positions close to each other so as to correspond to a distance between the brush-side connecting plates 53a and 53b. Therefore, unless the partition wall 55 is present when soldering is carried out, there is such a drawback that if solder flows from one of the brush-side connecting plates, the flowing solder expands to the other of the brush-side connecting plates to cause short-circuiting.

In contrast, in the wiper motor 11, even if the solder flows from one of the brush-side connecting plates, the flow of the solder is stopped by the partition wall 55, whereby the flowing solder can be prevented from expanding to the other of the brush-side connecting plates.

As shown in FIG. 7, since tip portions of the brush-side connecting plates 53a and 53b are soldered respectively to the unit connecting portions 56a and 56b of the brush holder 23, the solder easily flows from the tip portions. However, the projection distance $L_1$ of the partition wall 55 from the end portion located on the brush holder side is set to be equal to the projection distance $L_2$ of each of the brush-side connecting plates 53a and 53b from the end portion located on the brush holder side, so that the solder flowing from the tip portion of one of the brush-side connecting plates can be prevented from flowing into the other of the brush-side connecting plates beyond the tip of the partition wall 55.

On the other hand, as shown in FIG. 6, the power-feeding-side connecting plates 54a and 54b are respectively formed by bending metal plates such as copper plates and are disposed in parallel with each other, one end portions thereof are connected to the corresponding power-feeding terminals 45a and 45b of the connector 43 and the other ends thereof project into the accommodating case 51 in parallel with each other.

The noise-preventing means 57 is provided so as to be accommodated in the accommodating case 51 between the brush-side connecting plates 53a and 53b and the power-feeding-side connecting plates 54a and 54b of the connecting unit 52 in order to connect the brushes 22a and 22b and the power-feeding terminals 45a and 45b, respectively, and to absorb noises generated from the slide-contact portions between the commutator 14 and each of the brushes 22a and 22b.

The noise-preventing means 57 includes a pair of choke coils 58a and 58b and a bidirectional varistor 59 serving as a capacitive device having functions as a capacitor and a varistor. Meanwhile, the accommodating case 51 is provided with a partition wall 60 for partitioning the accommodating case 51 into three spaces. The respective choke coils 58a and 58b are disposed in the accommodating case 51 in parallel with each other and are separated from one another by the partition wall 60. The bidirectional varistor 59 is arranged and accommodated on a side of the connector 43 with respect to the respective choke coils 58a and 58b, and is separated from the respective choke coils 58a and 58b by the partition wall 60. The respective spaces partitioned by the partition wall 60 are set at shapes and sizes corresponding to outer shapes of the choke coils 58a and 58b and the bidirectional varistor 59, so that the choke coils 58a and 58b and the bidirectional varistor 59 are easily mounted in the spaces, respectively.

Incidentally, only a capacitor or varistor may be mounted as the capacitive device.

One end of the choke coil 58a is connected to the brush-side connecting plate 53a while the other end thereof is connected to the power-feeding-side connecting plate 54a, namely, the choke coil 58a is connected in series between a positive-pole side of the brush 22a and a positive-pole side of the power-feeding terminal 45a. Similarly, one end of the choke coil 58b is connected to the brush-side connecting plate 53b while the other end thereof is connected to the power-feeding-side connecting plate 54b, namely, the choke coil 58b is connected in series between a negative-pole side of the brush 22b and a negative-pole side of the power-feeding terminal 45b. One end of the bidirectional varistor 59 is connected to the power-feeding-side connecting plate 54a while the other end thereof is connected to the power-feeding-side connecting plate 54b, namely, the bidirectional varistor 59 is electrically connected between the respective choke coils 58a and 58b.

Thereby, even if noises are generated from the slide-contact portion between the brushes 22a and 22b and the commutator 14, the noises flowing in the power-feeding circuit 21 are absorbed by the choke coils 58a and 58b and the bidirectional varistor 59, so that emission of the noises to the outside of the motor can be reduced. The noise-preventing means 57 is provided just behind an outlet of the power-feeding circuit 21 from the motor yoke 16, namely, behind the opening portion through which the respective brush-side connecting plates 53a and 53b extend, so that the noises emitted from the interior of the motor yoke 16 to the outside via the opening portion can be removed by the noise-preventing means 57 before propagating to other wirings or the like, whereby the emission of the noises to the outside of the motor can be reduced.

Thus, in the wiper motor 11, since the noise-preventing means 57 is disposed outside the motor yoke 16, the noises emitted from the interior of the motor yoke 16 via the opening portion can be removed by the noise-preventing means 57 before propagating to other wirings, so that the emission of the noises from the wiper motor can be reduced.

In the wiper motor 11, since the noise-preventing means 57 is accommodated in the accommodating case 51 provided integrally with the brush holder 23, assembling work of the noise-preventing means 57 can be made easily.

In the wiper motor 11, since the partition wall 60 is provided in the accommodating case 51 and the choke coils 58a and 58b and the bidirectional varistor 59 are accommodated in the accommodating spaces formed by the partition wall 60, work in which the respective elements configuring the noise-preventing means 57 are assembled to the accommodating case 51 can be facilitated.

In the wiper motor 11, since the accommodating case 51 is disposed on the outer face of the motor yoke 16 or gear case 26, the noise-preventing means 57 can be assembled at a final stage during a motor assembling step, so that specification classification of the wiper motor 11 based on presence/absence of the noise-preventing means 57 can be facilitated.

After the connecting unit 52 is accommodated in the accommodating case 51, the accommodating case 51 is covered with a lid and assembled to the brush holder 23. Each of FIGS. 8A and 8B is a perspective view showing the accommodating case in a state of being covered with the lid, and FIG. 9 is a bottom view showing the accommodating case in a state of being covered with the lid.

Figure 8A:
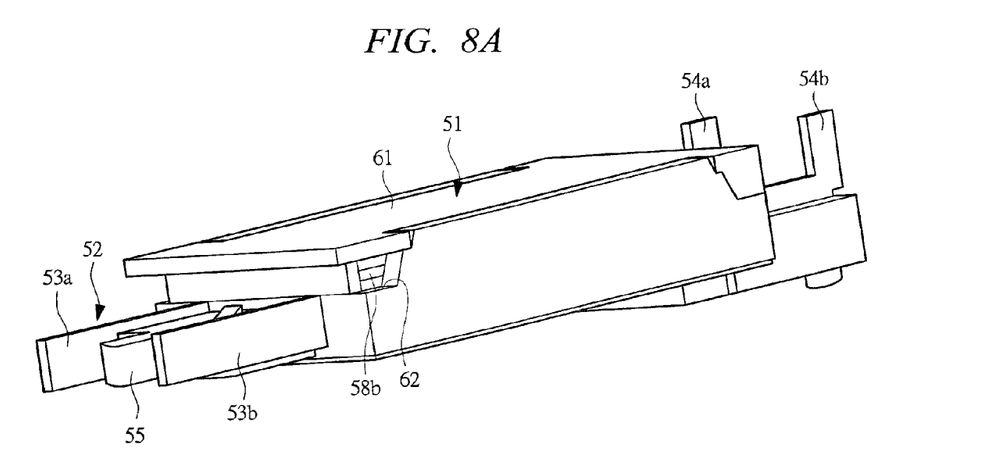
FIG. 8A is a perspective view showing the accommodating case covered with a lid.

As shown in FIG. 8A, a connection confirming window 62 is formed at a connection portion between the brush-side connecting plate 53b and the choke coil 58b on a side face of a lid 61 located on a fixing side of the brush-side connecting plate 53b. Therefore, confirmation about whether or not the brush-side connecting plate 53b and the choke coil 58b have been soldered to each other can be made by looking the interior of the accommodating case 51 from the connection confirming window 62. Incidentally, though not illustrated, a similar confirming window is formed in a side face of the lid 61 located on a fixing side of the brush-side connecting plate 53a.

Figure 8B:
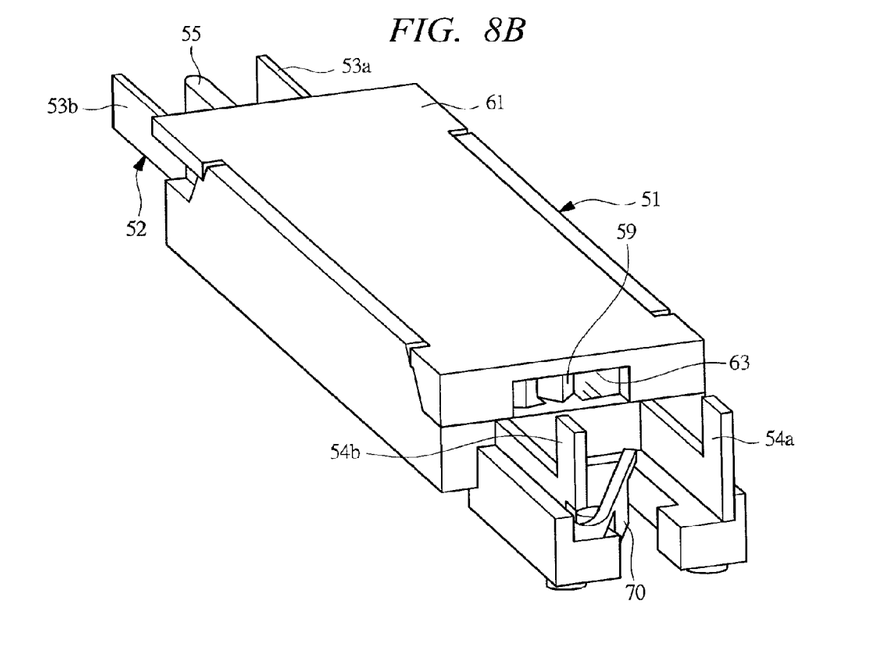
FIG. 8B is a perspective view showing the accommodating case covered with the lid.

As shown in FIG. 8B, a connection confirming window 63 is formed at a connection portion between the power-feeding-side connecting plates 54a and 54b and the bidirectional varistor 59 in a side wall of an end portion of the lid 61 located on a side of the connector 43, so that whether or not the power-feeding-side connecting plates 54a and 54b and the bidirectional varistor 59 have been soldered can be confirmed through the connection confirming window 63.

Figure 9:
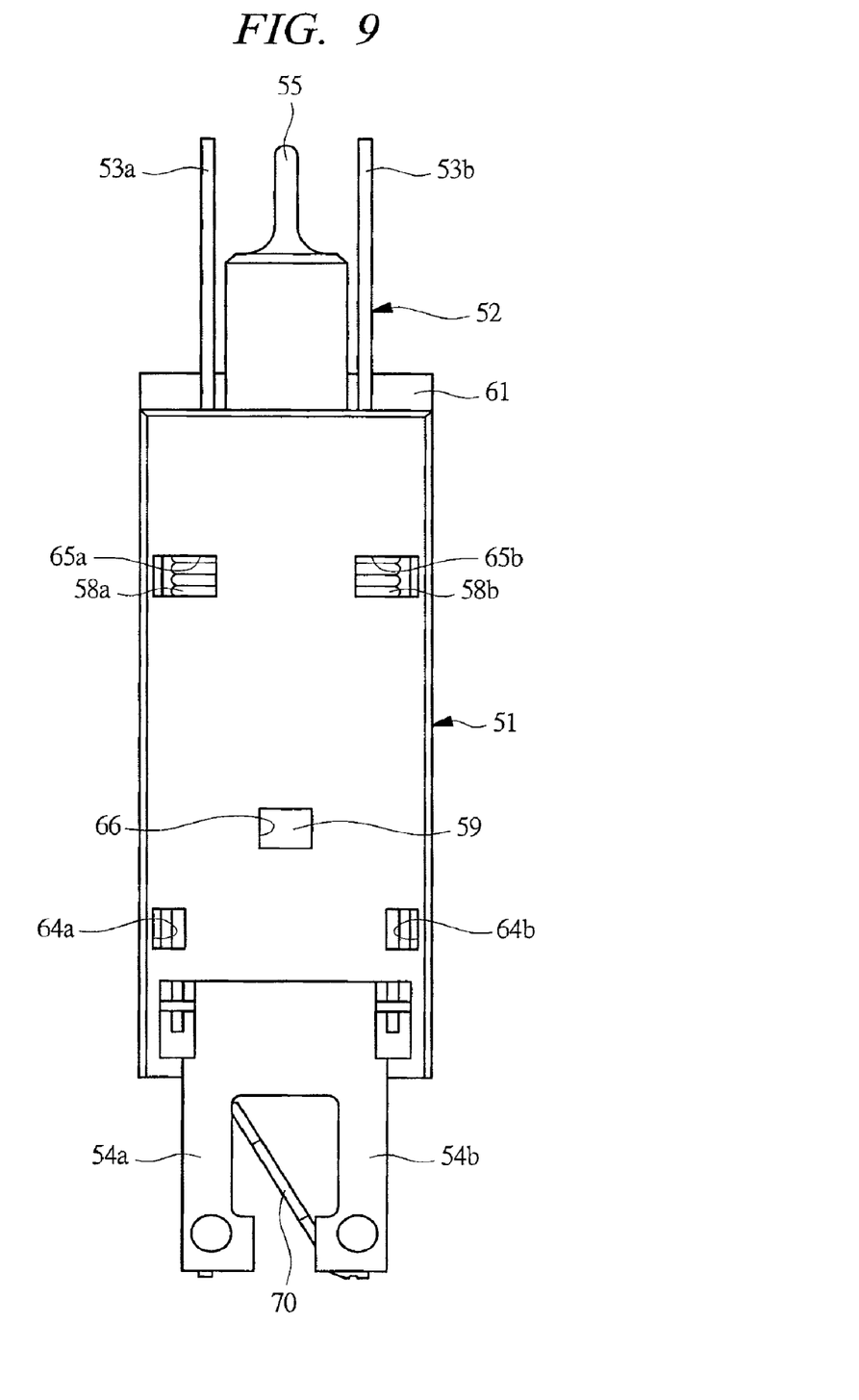
FIG. 9 is a bottom view showing the accommodating case covered with the lid.

As shown in FIG. 9, a connection confirming window 64a is formed at a connection portion between the power-feeding-side connecting plate 54a and the choke coil 58a in a bottom face of the accommodating case 51, so that whether or not the power-feeding-side connecting plate 54a and the choke coil 58a have been soldered can be confirmed through the connection confirming window 64a. A similar connection confirming window 64b is also formed at a connection portion between the power-feeding-side connecting plate 54b and the choke coil 58b.

Choke-coil confirming windows 65a and 65b are formed at locations where the choke coils 58a and 58b are accommodated in a bottom face of the accommodating case 51, so that whether or not the choke coils 58a and 58b have been disposed in the accommodating case 51 can be confirmed by looking the choke-coil confirming windows 65a and 65b.

A varistor confirming window 66 is similarly formed at a location where the bidirectional varistor 59 has been accommodated in the bottom face of the accommodating case 51.

As shown in FIG. 1, in a state of assembling the accommodating case 51 to the brush holder 23, the connection confirming window for confirming a connection between the brush-side connecting plate and the choke coil is covered with the motor yoke 16; the connection confirming window for confirming a connection between the power-feeding-side connecting plate and the bidirectional varistor is covered with the connector 43; and each of the connection confirming window for confirming the power-feeding-side connecting plate and the choke coil, the choke-coil confirming window, and the varistor confirming window is covered with the outer face of the gear case 26.

Thus, in the accommodating case 51, since the connection confirming windows 62, 63, 64*a*, and 64*b* are formed, even after the accommodating case 51 is covered with the lid 61, soldering of the connection portions between the brush-side connecting plates 53*a* and 53*b* or power-feeding-side connecting plates 54*a* and 54*b* and the choke coils 58*a* and 58*b* or bidirectional varistor 59 of the noise-preventing means 57 can be confirmed, namely, connection portions among constituent elements of the connecting unit 52 can be confirmed. Similarly, since the choke-coil confirming windows 65*a* and 65*b* and the varistor confirming window 66 are formed, it is possible to confirm that the choke coils 58*a* and 58*b* and the bidirectional varistor 59 of the noise-preventing means 57 which are constituent elements of the connecting unit 52 have been provided in the accommodating case 51.

In the accommodating case 51, since the above-mentioned respective confirming windows have been formed in the side face and the bottom face of the accommodating case 51, the respective confirming windows can be closed when the accommodating case 51 has been assembled to the brush holder 23. Thereby, short-circuiting occurring due to mixture of foreign materials from the respective confirming windows into the accommodating case 51 can be prevented.

Figure 10A:
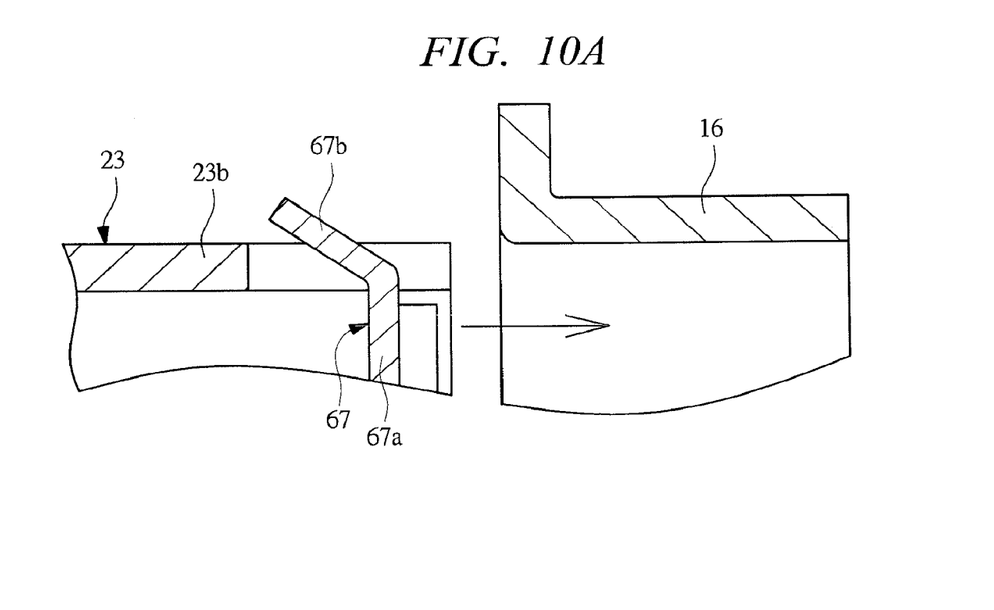
FIG. 10A is a sectional view showing a grounding procedure of a motor-yoke-side grounding terminal to a motor yoke.
Figure 10B:
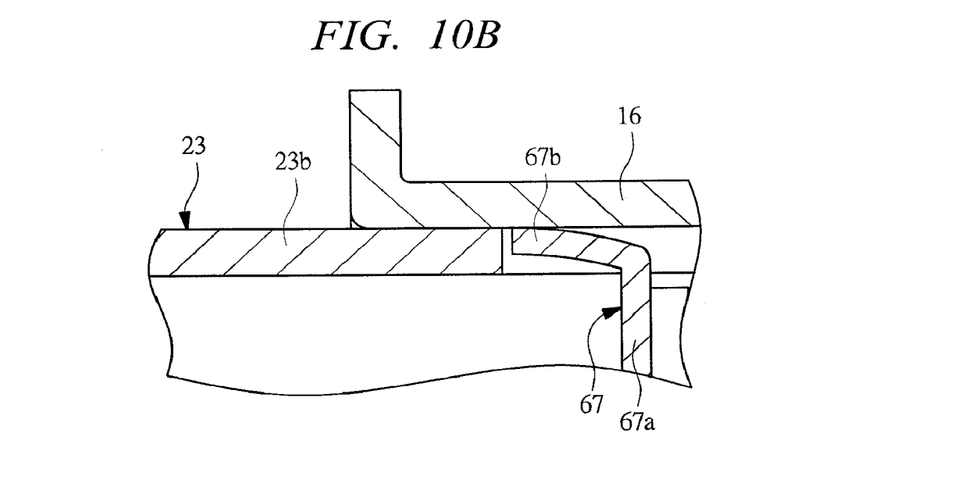
FIG. 10B is a sectional view showing a grounding procedure of a motor-yoke-side grounding terminal to a motor yoke.

Each of FIGS. 10A and 10B is a sectional view showing a grounding procedure of motor-yoke-side grounding terminals to the motor yoke.

In order to ground a negative-pole side of the brush 22*b* to the motor yoke 16, the brush holder 23 is provided with a motor-yoke-side grounding terminal 67. The motor-yoke-side grounding terminal 67 is formed by bending a metal plate such as a copper plate. A body portion 67*a* of the terminal is fixed to the body-wall portion 23*a* of the brush holder 23; and a terminal portion 67*b* thereof is bent to the body portion 67*a* and formed into a shape of an inequality sign of "<" and, as shown in FIG. 10A, protrudes from a notched portion formed in the outer-peripheral wall portion 23*b* to the outside of the outer-peripheral wall portion 23*b*. The body portion 67*a* of the motor-yoke-side grounding terminal 67 is connected to the negative-pole side of the brush 22*b* and the negative-pole side of the brush-side connecting plate 53*b* via a wiring plate provided on the brush holder 23.

When the brush holder 23 is mounted inside the motor yoke 16, as shown in FIG. 10B, the terminal portion 67*b* of the motor-yoke-side grounding terminal 67 contacts with an inner face of the motor yoke 16 in its elastically deformed state, so that negative-pole side of the brush 22*b* is grounded to the motor yoke 16. When the negative-pole side of the brush 22*b* is grounded to the motor yoke 16, a shielding effect is exerted on the motor yoke 16, thereby preventing noises from being emitted to the outside of the motor via the motor yoke 16.

Figure 11:
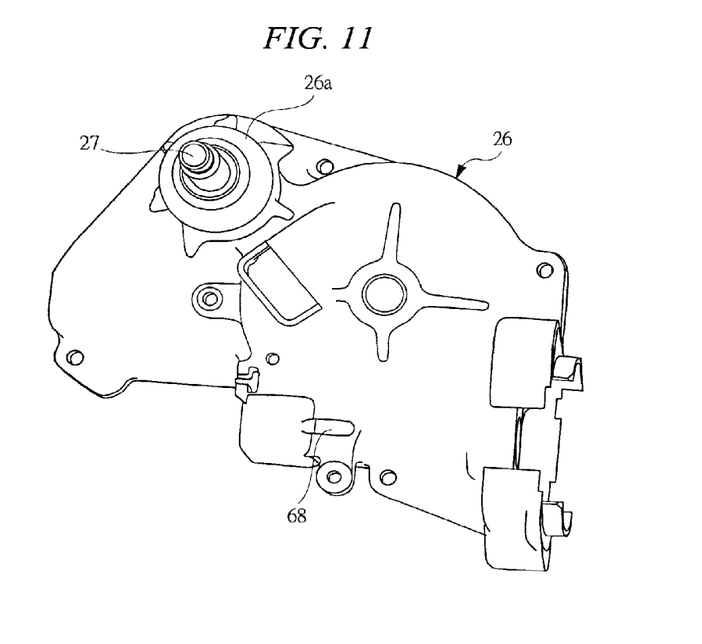
FIG. 11 is a perspective view showing a gear case before a brush holder is attached.
Figure 12:
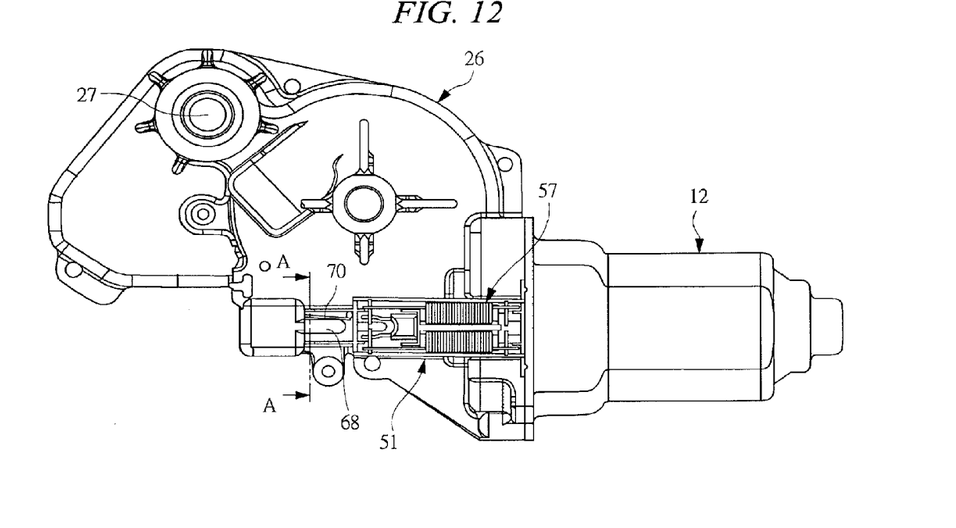
FIG. 12 is an explanatory view showing a positional relationship between a protrusion portion and a rotating shaft shown in FIG. 11.
Figure 13:
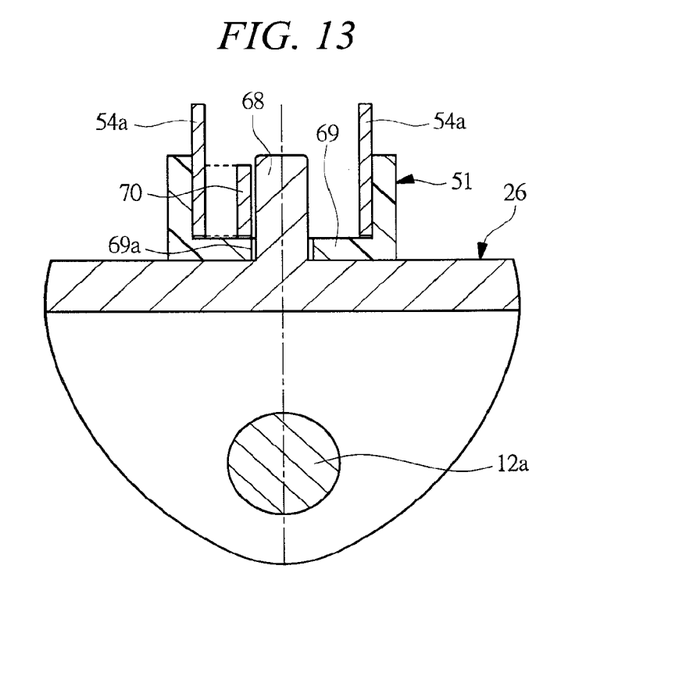
FIG. 13 is a sectional view taken along line A-A in FIG. 12.
Figure 14A:
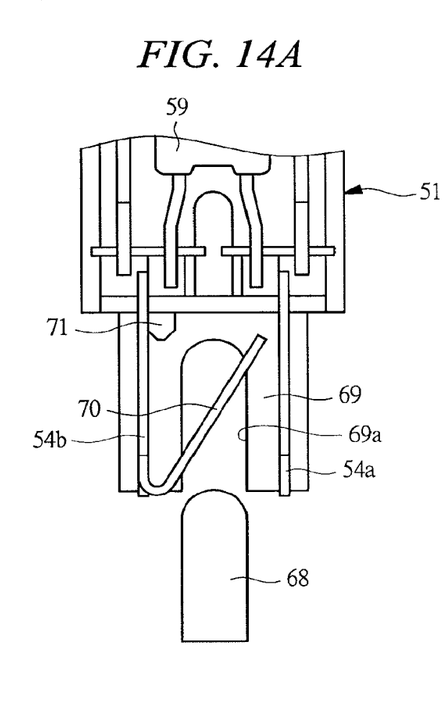
FIG. 14A is a front view showing a connecting procedure of a gear-case-side connecting plate to the protrusion portion.
Figure 14B:
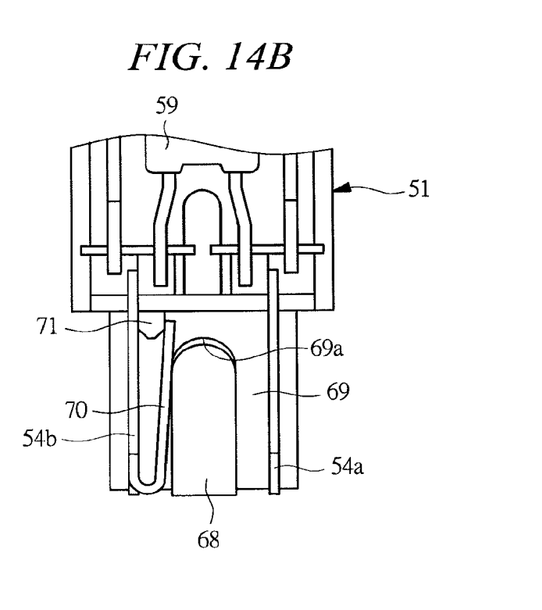
FIG. 14B is a front view showing a connecting procedure of a gear-case-side connecting plate to the protrusion portion.

FIG. 11 is a perspective view showing the gear case before the brush holder is attached, and FIG. 12 is an explanatory view showing a positional relationship between a protrusion portion and a rotational shaft shown in FIG. 11. FIG. 13 is a sectional view taken along line A-A in FIG. 12, and each of FIGS. 14A and 14B is a front view showing a connecting procedure of the gear-case-side grounding terminal to the protrusion portion.

As shown in FIG. 11, a ground protrusion portion 68 is provided on an outer face of the gear case 26. As shown in FIG. 11, the protrusion portion 68 is made from a conductor as an aluminum alloy and formed integrally with the gear case 26, thereby being electrically connected to the gear case 26 and the motor yoke 16. As shown in FIG. 12 and FIG. 13, the protrusion portion 68 is arranged on a crossing line (shown by a dashed-dotted line in FIG. 12) between a plane (shown in a dashed-dotted line in FIG. 13), which passes through an axial center of the rotating shaft 12*a* of the motor body 12 and is orthogonal to the outer face of the gear case 26, and the outer face. That is, the protrusion portion 68 is disposed, as viewed from the axial direction of the output shaft 27, on the central axial line of the motor body 12, i.e., the rotating shaft 12*a*.

On the other hand, as shown in FIG. 6, an engaging plate 69 is provided at a tip portion of the accommodating case 51 located on a side of the connector 43. As shown in FIG. 14, the accommodating case 51 is positioned on the gear case 26 by causing an engagement groove 69*a* formed in the engaging plate 69 to be engaged with the protrusion portion 68. When the accommodating case 51 is positioned by the protrusion portion 68, the respective power-feeding-side connecting plates 53*a* and 53*b* to be fixed to the accommodating case 51 are disposed so as to sandwich the protrusion portion 68 therebetween and be opposed to each other via the protrusion portion 68 and so that the protrusion portion 68 is positioned between respective intermediate locations of the power-feeding-side connecting plates 53*a* and 53*b*.

As shown in FIG. 6, a gear-case-side grounding terminal 70 is provided on the negative-pole side of the power-feeding-side connecting plate 54*b* in order to ground the power-feeding-side connecting plate 54*b* to the gear case 26. The gear-case-side grounding terminal 70 is formed into a V shape by bending one portion, i.e., a tip portion of the power-feeding-side connecting plate 54 which projects from the accommodating case 51 toward a side of the connector 43, thereby becoming elastically deformable in its bending direction, i.e., in a direction of approaching to or separating from the positive-pole side of the power-feeding-side connecting plate 54*a*. That is, the gear-case-side grounding terminal 70 is made from a metal plate such as a copper plate and formed integrally with the power-feeding-side connecting plate 54*b*. When the accommodating case 51 is disposed on the gear case 26 in a state where the accommodating case 51 has been positioned by the protrusion portion 68, as shown in FIG. 14B, the gear-case-side grounding terminal 70 contacts with a side face of the protrusion portion 68 in an elastically deformed state thereof. The accommodating case 51 is provided with an abutting portion 71, which abuts on a tip portion of the gear-case-side grounding terminal 70 in a state of contacting with the side face of the protrusion portion 68. A tip side of the gear-case-side grounding terminal 70 is sandwiched between the protrusion portion 68 and the abutting portion 71, so that the gear-case-side grounding terminal 70 is caused to contact with the protrusion portion 68 more firmly.

The gear-case-side grounding terminal 70 is grounded to the gear case 26 located on the side of the power-feeding terminals 45*a* and 45*b* rather than the noise-preventing means 57; the gear case 26 is electrically connected to the motor yoke 16; and further the motor yoke 16 is connected to the power-feeding circuit 21 by the motor-yoke-side grounding terminal 67. Therefore, noises that have not been absorbed by the noise-preventing means 57 are returned back to the interior of the motor body 12 via the gear case 26 and the motor yoke 16, whereby noises emitted to the outside of the motor can be reduced.

Thus, in the wiper motor 11, the brush 22b is grounded to the motor yoke 16 by the motor-yoke-side grounding terminal 67, and the power-feeding circuit 21 is grounded to the gear case 26 located on the side of the power-feeding terminals 45a and 45b rather than the noise-preventing means 57 by the gear-case-side grounding terminal 70. Therefore, noises that have not been removed by the noise-preventing means 57 is returned back to the interior of the motor body 12 via the gear-case-side grounding terminal 70 and the motor-yoke-side grounding terminal 67, so that the emission of the noises to the outside of the motor can be reduced.

In the wiper motor 11, the gear-case-side grounding terminal 70 is formed into a V shape by bending the tip portion of the power-feeding-side connecting plate 54b, and the gear-case-side grounding terminal 70 is caused to contact with the ground protrusion portion 68 provided on the gear case 26 in the elastically deformed state. Therefore, the gear-case-side grounding terminal 70 can be caused to contact with the protrusion portion 68 in a state where a spring force is always applied. Especially, by bending the portion of the power-feeding-side connecting plate 54b to form the gear-case-side grounding terminal 70 into a V shape, sufficient flexing length can be secured for the gear-case-side grounding terminal 70 even in a narrow space. Thereby, the gear-case-side grounding terminal 70 can be caused to contact with the protrusion portion 68 reliably, whereby the power-feeding circuit 21 can be grounded to the gear case 26 reliably. Since the accommodating case 51 is mounted on the gear case 26, the gear-case-side grounding terminal 70 can be easily grounded to the protrusion portion 68. That is, since the gear-case-side grounding terminal 70 can be grounded to the gear case 26 reliably without using any fastening member such as a screw, the number of parts and the number of steps for the wiper motor 11 can be reduced.

Further, in the wiper motor 11, the protrusion portion 68 is disposed on the crossing line between the plane, which passes through the axial center of the rotating shaft 12a and is orthogonal to the outer face of the gear case 26, and the outer face and the pair of power-feeding-side connecting plates 54a and 54b are disposed so as to sandwich the protrusion portion 18 therebetween and be opposed to each other. Therefore, the same motor body 12 can be used with respect to the respective gear cases 26 even if the gear cases 26 are formed into two kinds of symmetrical shapes according to a specification state such as a mounting state of the wiper motor 11 on the vehicle body. That is, versatility of the motor body 12 to a difference in type or size of the gear case 26 is increased, so that the wiper motor 11 can be reduced in cost.

The present invention is not limited to the above embodiments and, needless to say, may be modified variously within a scope of not departing from the gist of the present invention. For example, in the embodiment, the case where the present invention is applied to the wiper motor 11 for driving the rear wiper arm of the vehicle has been shown. However, the present invention is not limited to the case, and may be applied to a motor etc. used as a drive source for a power window apparatus for vehicle, an electric sun-roof apparatus for vehicle, or the like.

In the embodiment, the reduction gear apparatus 13 is provided with the power converting mechanism 34. However, the present invention is not limited to this case and, if the reduction gear mechanism 28 is provided, may not necessarily provide the power converting mechanism 34.

Further, the embodiment has a structure in which the brush-side connecting plates 53a and 53b and the power-feeding-side connecting plates 54a and 54b are formed as separate parts and the connecting plates 53a to 54b are connected by the noise-preventing means 57. However, the present invention is not limited to the structure, and the brush-side connecting plates 53a and 53b and the power-feeding-side connecting plates 54a and 54b may be integrally formed without providing the noise-preventing means 57.

Further, in the embodiment, the projection distance $L_1$ of the partition wall 55 from the end portion thereof located on the side of the brush holder 23 is set to be equal to the projection distance $L_2$ of the brush-side connecting plates 53a or 53b from the end portion thereof located on the side of the brush holder 23. However, the former projection distance $L_2$ may be set to be longer than the latter projection distance $L_2$ of each of the brush-side connecting plates 53a and 53b from the end portion thereof located on the side of the brush holder 23.

In the embodiment, two brushes are provided at two locations of the brush holder 23. However, the brushes may be provided at three or more locations of the brush holder and three or more brush-side connecting plates may be provided so as to correspond thereto.

In the embodiment, the gear-case-side grounding terminal 70 is formed into a V shape by bending the tip portion of the power-feeding-side connecting plate 54b. However, the present invention is not limited to this, and may adopt any shape which can bring the power-feeding-side connecting plate 54b in contact with the protrusion portion 68 in an elastically deformed state of a portion of the power-feeding-side connecting plate 54b, such as a shape obtained by bending a portion of the power-feeding-side connecting plate 54b to be formed into a shape of an inequality sign of "<".

What is claimed is:

1. An electric motor with reduction gear mechanism including a motor body provided with a rotating shaft and a reduction gear mechanism for decelerating rotation of the rotating shaft to output it from an output shaft, the electric motor comprising:
   an armature provided with a commutator fixed to the rotating shaft and a coil connected to the commutator;
   a motor yoke having a magnet mounted on its inner face and rotatably accommodating the armature;
   a brush holder mounted inside the motor yoke and holding a pair of brushes slide-contacting with the commutator;
   a gear case fixed to the motor yoke and accommodating the reduction gear mechanism;
   a connector provided with a pair of power-feeding terminals each connected to a power source, the connector being disposed on the gear case;
   an accommodating case provided integrally with the brush holder and projecting toward the gear case via an opening portion of the motor yoke to be disposed on an outer face of the gear case; and
   a noise-preventing means accommodated in the accommodating case and connected between the brushes and the power-feeding terminal.

2. An electric motor with reduction gear mechanism including a motor body provided with a rotating shaft and a reduction gear mechanism for decelerating rotation of the rotating shaft to output it from an output shaft, the electric motor comprising:
   an armature provided with a commutator fixed to the rotating shaft and a coil connected to the commutator;
   a motor yoke having a magnet mounted on its inner face and rotatably accommodating the armature;

a brush holder mounted inside the motor yoke and holding a pair of brushes slide-contacting with the commutator;

a motor-yoke-side grounding terminal provided on the brush holder, connected to each of the brushes on a negative-pole side, and contacting with the inner face of the motor yoke;

a gear case formed from a conductor, fixed in a state where the gear case has been electrically connected to the motor yoke, and accommodating the reduction gear mechanism;

a connector provided with a pair of power-feeding terminals each connected to a power source, the connector being disposed on the gear case;

a noise-preventing means accommodated in an accommodating case disposed on an outer face of the gear case, connected to the brushes via an opening portion of the motor yoke by a pair of brush-side connecting plates, and connected to the power-feeding terminals by a pair of power-feeding-side connecting plates; and a gear-case-side grounding terminal provided on a negative-pole side of the power-feeding-side connecting plate and including a gear-case-side grounding terminal contacting with the gear case.

3. The electric motor with reduction gear mechanism according to claim 1, wherein the noise-preventing means includes a pair of choke coils connected in series between the brushes and the power-feeding terminals so as to correspond to the choke coils and a capacitive device electrically connected to the pair of choke coils.

4. The electric motor with reduction gear mechanism according to claim 3, wherein the accommodating case has a partition wall for separating the choke coils and the capacitive device from one another.

5. The electric motor with reduction gear mechanism according to claim 3, wherein the capacitive device comprises a bidirectional varistor.

6. The electric motor with reduction gear mechanism according to claim 3, wherein the capacitive device is a capacitor.

7. The electric motor with reduction gear mechanism according to claim 3, wherein the capacitive device is a varistor.

8. The electric motor with reduction gear mechanism according to claim 1, further comprising:

a pair of brush-side connecting plates for connecting the brushes and the noise-preventing means via the opening portion of the motor yoke; and a pair of power-feeding-side connecting plates for connecting the noise-preventing means and the power-feeding terminals.

9. The electric motor with reduction gear mechanism according to claim 2, wherein the gear-case-side grounding terminal is formed by bending a portion located on a negative-pole side of the power-feeding-side connecting plate, and the gear-case-side grounding terminal is caused to contact with a ground protrusion portion provided on the gear case in a state of being elastically deformed.

10. The electric motor with reduction gear mechanism according to claim 9, wherein the protrusion portion is disposed on a crossing line between a plane, which passes through an axial center of the rotating shaft and is orthogonal to the outer face, and the outer face, and a pair of the connecting plates are disposed so as to sandwich the protrusion portion therebetween and be opposed to each other.

11. The electric motor with reduction gear mechanism according to claim 2, further comprising:

a pair of connecting portions provided on the brush holder and connecting the brushes and the pair of brush-side connecting plates; and a partition wall provided in the accommodating case to project between the pair of brush-side connecting plates.

12. The electric motor with reduction gear mechanism according to claim 11, wherein a projection distance of the partition wall from the accommodating case is equal to or longer than a projection distance of each of the pair of brush-side connecting plates from the accommodating case.

13. The electric motor with reduction gear mechanism according to claim 11, wherein the partition wall is provided at an end portion of the accommodating case located on a side of the brush holder.

14. The electric motor with reduction gear mechanism according to claim 1, further comprising a confirming window formed in the accommodating case to allow confirmation of presence/absence of the noise-preventing means.

15. The electric motor with reduction gear mechanism according to claim 2, further comprising a confirming window formed in the accommodating case to allow confirmation of presence/absence of a connection between the noise-preventing means and the brush-side connecting plate or power-feeding-side connecting plate.

16. The electric motor with reduction gear mechanism according to claim 14, wherein the confirming window is formed in a side face of the accommodating case and is covered with the motor yoke or connector.

17. The electric motor with reduction gear mechanism according to claim 14, wherein the confirming window is formed on a bottom face of the accommodating case and is covered with an outer face of the gear case.

* * * * *